F. HAMACHEK.
PEA SEPARATOR.
APPLICATION FILED AUG. 12, 1912.
1,153,304.
Patented Sept. 14, 1915.
5 SHEETS—SHEET 3.
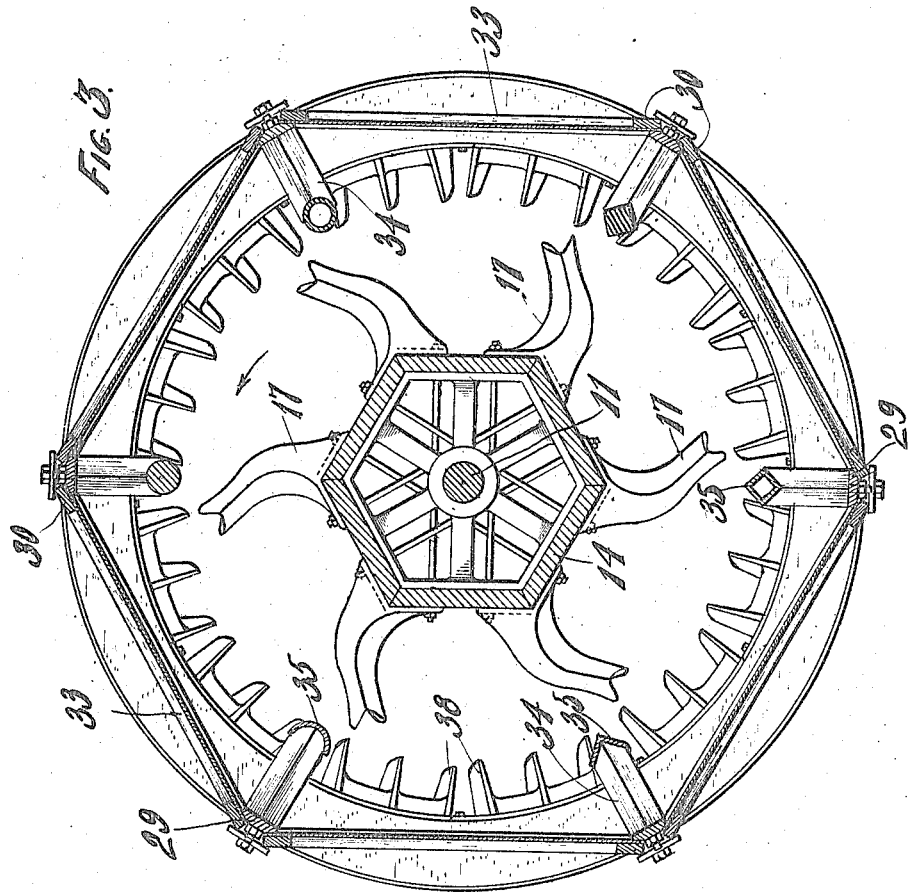
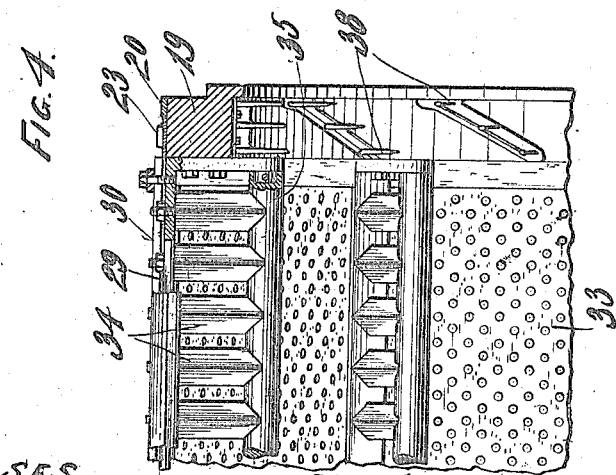

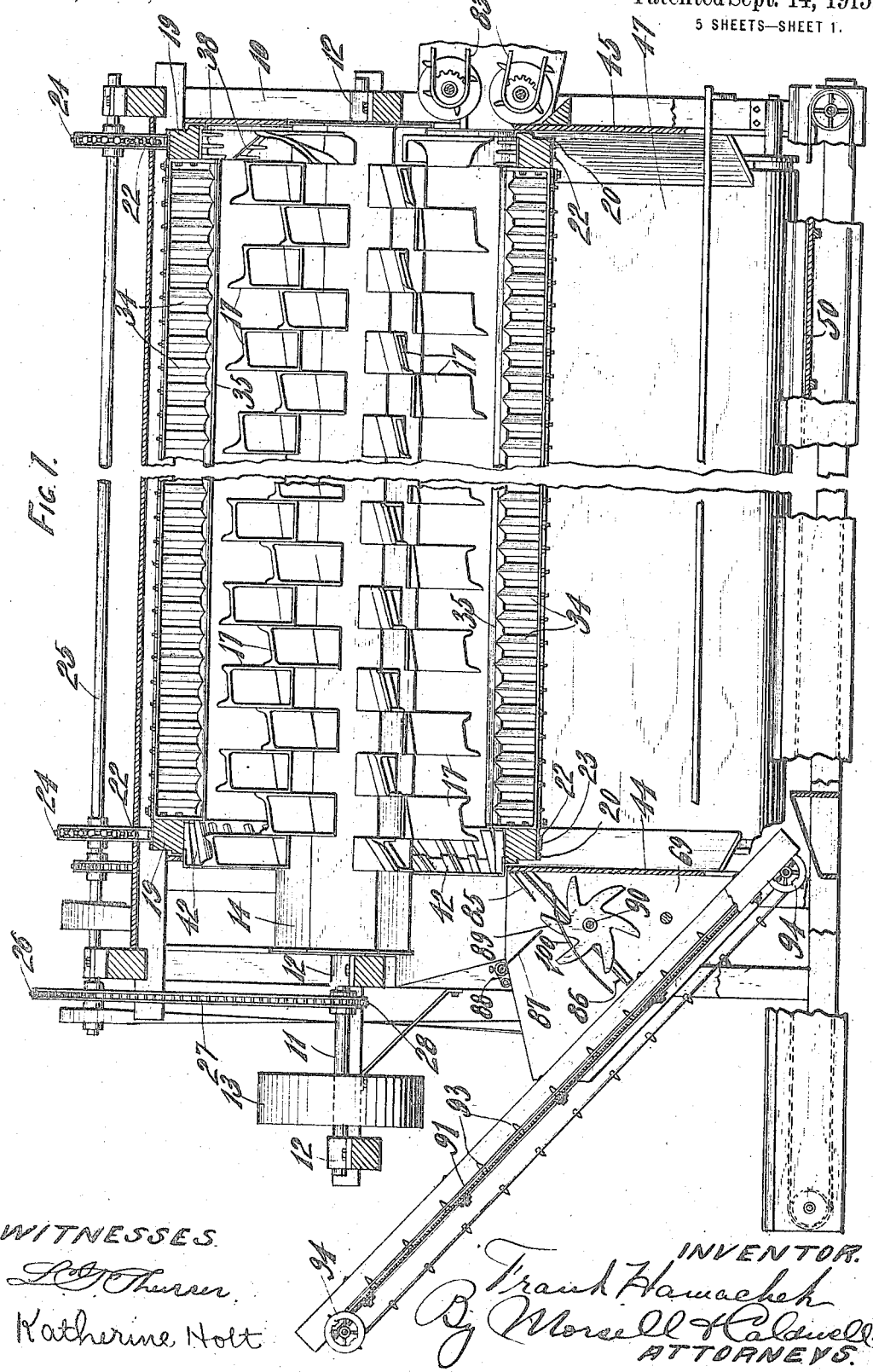

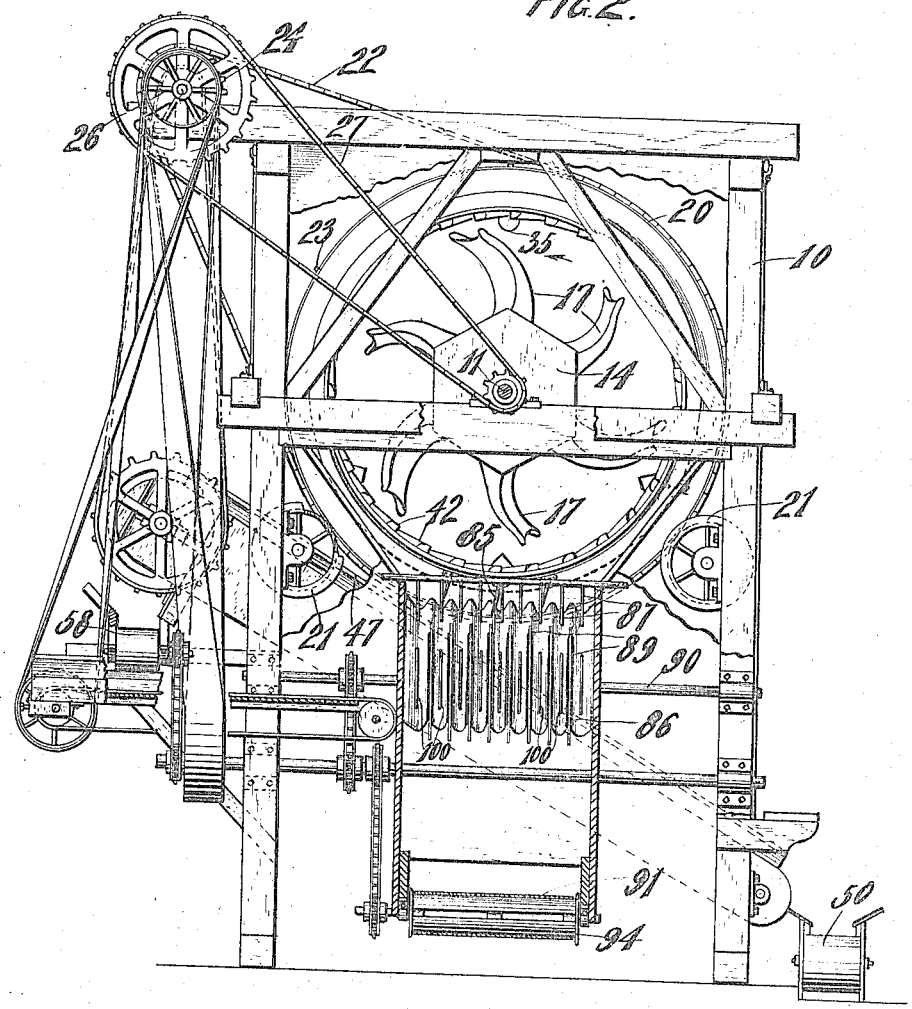

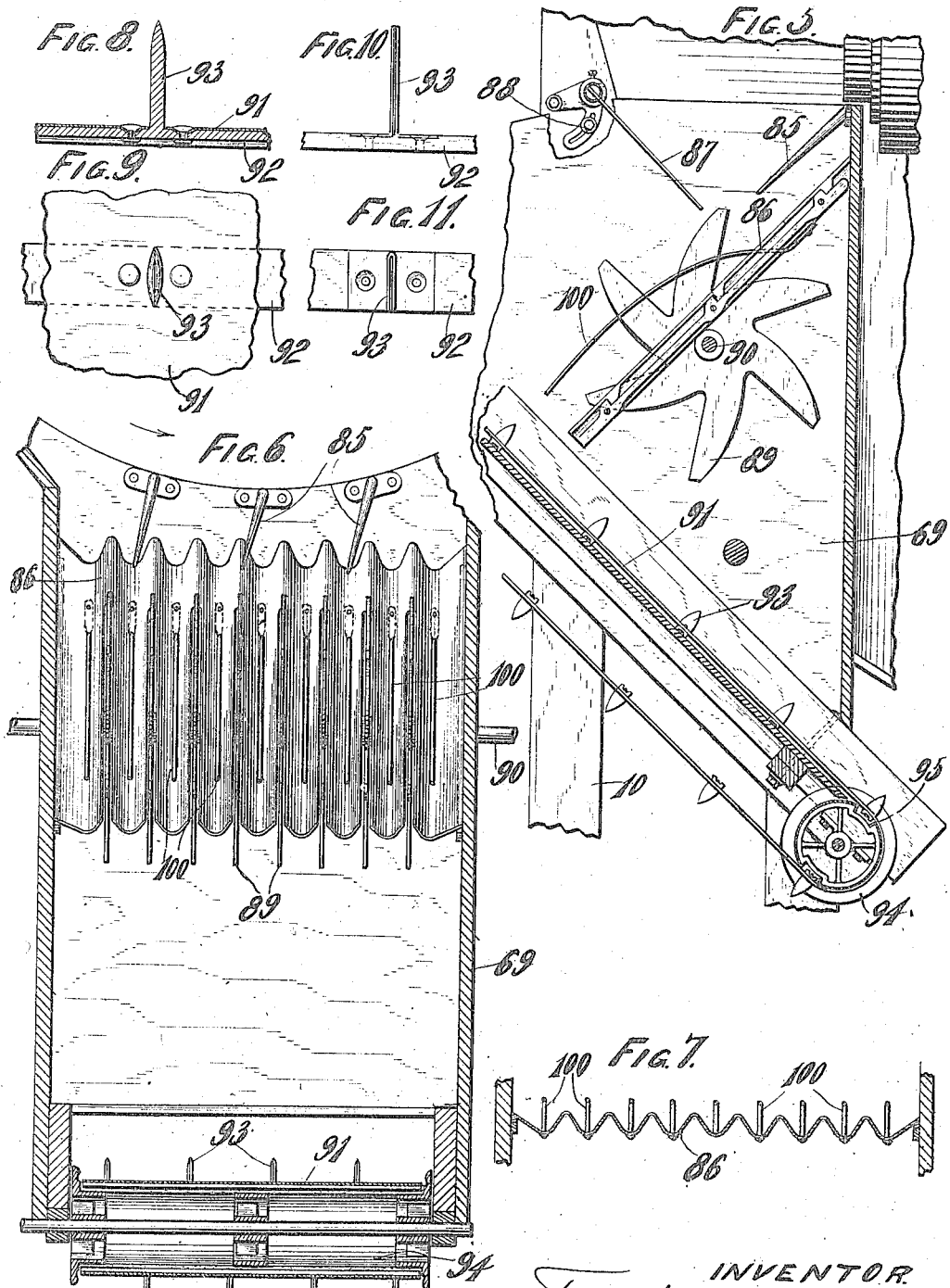

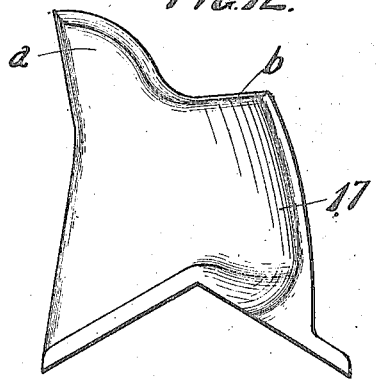
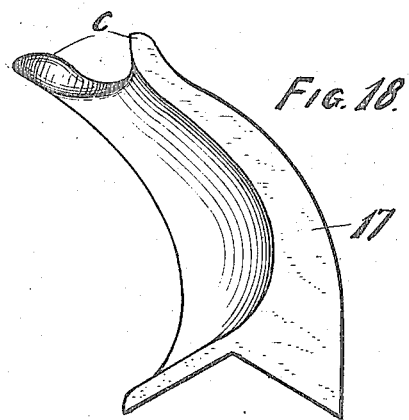
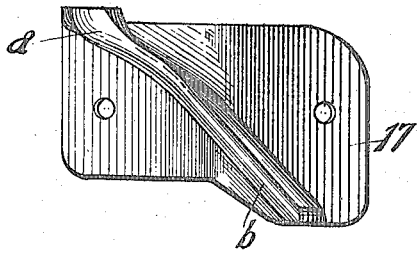
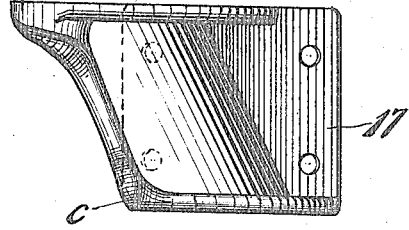
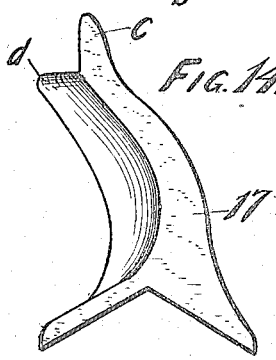
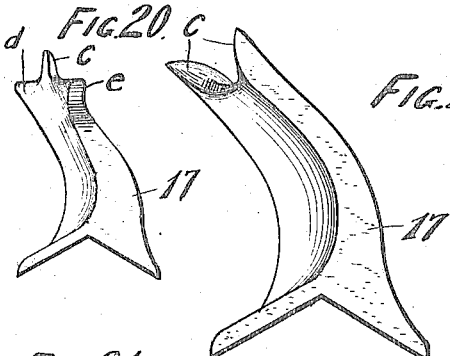
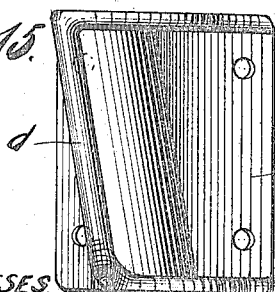
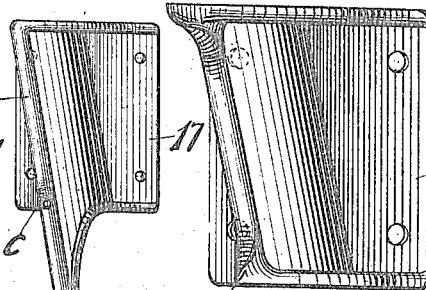

UNITED STATES PATENT OFFICE.

FRANK HAMACHEK, OF KEWAUNEE, WISCONSIN.

PEA-SEPARATOR.

1,153,304.  Specification of Letters Patent.  Patented Sept. 14, 1915.

Application filed August 12, 1912. Serial No. 714,581.

*To all whom it may concern:*

Be it known that I, FRANK HAMACHEK, a citizen of the United States, and resident of Kewaunee, in the county of Kewaunee and State of Wisconsin, have invented new and useful Improvements in Pea-Separators, of which the following is a description, reference being had to the accompanying drawings, which are a part of this specification.

This invention relates to pea separators which operate upon the crop of pea vines as harvested and by keeping the vines well separated and subjecting them to blows of rotating beaters causes the pods to break and liberate the green peas which are then sifted from the pods and vines and immediately discharged to avoid injury to them.

The objects of the present invention are to improve upon details of construction of pea separators generally and particularly of the pea separator construction illustrated and described in my application for pea hullers and separators which resulted in Letters Patent No. 1,035,184, dated August 13, 1912.

One of the objects of the invention is to provide stationary discharging fingers at the discharge end of the sifter drum which extend downwardly and obliquely from the discharge opening of the drum in order to engage vines which may partially extend through the opening and thus coöperate with the turning of the drum in drawing vines out of the drum and preventing their accumulating at the discharge opening.

Another object of the invention is to provide a slotted, grooved chute leading from the discharge opening of the sifter drum with agitator wheels turning through the slots thereof to engage the tailings and lift them and shake them while they are somewhat restrained in their travel by means of adjustable spring teeth above the chute and through this shaking and combing out operation effect the separation of such peas as may have gone through the sifter drum with the tailings, the grooves of the chute affording a clear passageway for the discharge of such peas.

Another object of the invention is to improve upon details of construction of the tailings conveyer by means of which the tailings are discharged from the separator, whereby peas from the discharge chute and from the tailings may freely roll down the tailings conveyer while the tailings are being lifted thereby.

Another object of the invention is to improve upon various details of construction of pea separators.

With the above and other objects in view the invention consists in the pea separator as herein claimed and all equivalents.

Referring to the accompanying drawings in which like characters of reference indicate the same parts in different views: Figure 1 is a central longitudinal sectional view of a pea separator constructed in accordance with this invention; Fig. 2 is an end view thereof at the discharge end of the machine, parts being broken away for clearness of illustration; Fig. 3 is a transverse sectional view of the sifter drum and its beaters; Fig. 4 is a detail sectional view of one end of the sifter drum; Fig. 5 is a detail sectional view showing the construction of parts at the discharge end of the sifter drum; Fig. 6 is a similar view at right angles to the view shown in Fig. 5; Fig. 7 is a transverse sectional view of the discharge chute for tailings; Fig. 8 is a sectional view showing the construction of the projecting teeth of the tailings conveyer belt; Fig. 9 is a plan view thereof; Fig. 10 is a view showing a modified form of tooth construction for the tailings conveyer belt; Fig. 11 is a plan view thereof; and, Figs. 12 to 19 respectively are end and plan views of the four forms of hulling beaters employed, and Figs. 20 and 21 respectively are edge and plan views of a modified form of hulling beaters.

In these drawings 10 indicates a frame of any desirable construction which has a shaft 11 journaled through it in bearings 12. This shaft carries a pulley 13 by means of which it may be driven from any suitable source of power. Between the bearings 12 the shaft has mounted on it a hexagonal or other desirably shaped body portion 14 provided with hulling beaters 17 which may be variously shaped and are preferably oblique with relation to the axis of the body portion so that the turning movements of the shaft 11 cause them to act as propellers or fan blowers for causing a current of air to flow in the direction of the rear or discharge end of the machine where the pulley 13 is located.

Surrounding the body 14 with its hulling beaters is a sieve drum which has annular ends or heads 19 with metal bands or tracks 20 thereon which ride on rollers 21 on the frame to support the drum within the frame and permit it to rotate about the shaft 11 as its axis. A rotary movement is given to the drum by means of chains 22 which engage occasional lugs or sprocket teeth 23 on the heads 19 of the drum and which chains also travel around sprocket wheels 24 on a countershaft 25 which is journaled at the upper part of the frame and is driven from the shaft 11 by means of a sprocket wheel 26 on the shaft 25 connected by a chain 27 with a sprocket wheel 28 on said shaft 11. The direction of rotation of the drum is the same as the direction of rotation of the hulling beaters, being the direction indicated by the arrows in Figs. 2 and 3, but its speed is much slower.

The construction of the sieve drum is substantially the same as before, the same being true of the other construction thus far described. In the present construction, however, longitudinal rods 29 corresponding to the vine lifting rods 29 of my patented construction instead of being square in cross section are preferably flat as shown in Fig. 3 and have their edges beveled to fit with the rectangular sieve frames 30 containing perforated plates 33 of sheet rubber or the like forming the screens or sieves through the openings of which the hulled peas may freely pass. The longitudinal rods 29 form batten strips or fillets to cover the edges of the perforated rubber covering of the drum and to complete therewith the inner wall of the drum. In this construction also the longitudinal rods 29 have the row of closely spaced tubular sieve fingers 34 mounted on them, but the ends of such fingers of each row are connected by bars 35 which extend from one end of the sieve drum to the other and said bars 35 together with the fingers 34 constitute lifting ribs for lifting the vines, the bars 35 being longitudinal lifting members and the fingers 34 being spacing members for spacing said lifting members from the screening surface of the drum to afford a space for the peas to pass between the screening surface and the lifting members. The fingers 34 and the longitudinal bars 35 may be formed together or may be made separate and connected together in any desirable manner, and the lifting rib may be mounted in the drum by having the fingers attached to the longitudinal rods 29 as by means of bolts, as shown in Fig. 4. These bars 35 may be of any shape in cross section, various shapes being shown in Fig. 5 as examples and serve to lift the vines and drop them upon the hulling beaters and at the same time inclose the space between the fingers or spacing members 34 to prevent the vines becoming caught therein.

The oblique plates 38 forming rake teeth positioned at the feed end of the drum and the oblique ribs or vanes 42 positioned at the discharge end of the drum and other incidental structural features are the same as before except where specially noted. This is also true of the inclined separator apron 47 beneath the drum directing the falling peas to the conveyer 50 and the chaff and dirt to the waste conveyer 58.

The hulling beaters 17 preferably have the various forms illustrated in Figs. 12 to 19 inclusive, the form shown in Figs. 12 and 13 being the hulling beaters at the feed end of the drum with the long spike $a$ at the forward end to catch the vines as they leave the feeder 83 while the inclined blade portion $b$ deflects the vines inwardly to start their feeding movement through the drum. The next series of hulling beaters extending for some distance through the drum are those illustrated in Figs. 14 and 15 in which the spur $c$ at the rear edge serves as a rake tooth in straightening the vines while the rounded beaded edge $d$ as well as the curved face of the beater strike the pods with blows of sufficient force to open them and liberate the peas but by reason of their rounded surface avoid injury to the peas. For the remainder of the length of the sieve drum except for the last series the hulling beaters are of the type illustrated in Figs. 16 and 17 which differ from the preceding type in that the spurs $c$ are provided at both edges thereof as shown, thus increasing the combing action as the vines progress through the sieve drum and after they have had the greater number of peas freed therefrom. This combing action serves to untangle the vines and expose the pods which were protected by surrounding vines from the blows of the beaters. The final set of hulling beaters is of the type shown in Figs. 18 and 19 and differs from the type shown in Figs. 16 and 17 principally by having a greater obliquity and this is for the purpose of more quickly discharging the vines from the drum when they have reached this point and preventing their accumulating in a mass to obstruct the outlet.

The end plates 44 and 45 at the ends of the drum serve to confine the hulled peas to the space between them and fit close to the rings 19 as before and on the end plate 44 at the bottom of the discharge end of the sieve drum are secured a series of downwardly extending oblique teeth 85 which are so arranged as to readily engage a projecting portion of a bunch of vines while being carried around with the drum and as these teeth are stationary they tend to hold the vines while the drum turns away from them, thus assisting in the discharge of the vines from the drum. The teeth 85 being inclined are readily freed from the vines as the vines drop from the drum onto an inclined corrugated chute 86 below the teeth 85. The downward movement of the vines on the inclined chute 86 is restrained somewhat by the presence of a stationary inclined rake 87 which is adjustably mounted on the frame at 88 to be capable of having its position changed to suit the requirements. The tines of rake 87 project toward the corrugated inclined chute 86 and serve to hold the vines if they are in large masses and subject them to the action of rotating combing wheels 89 therebeneath. The combing wheels 89 are mounted on a shaft 90 which is journaled across the discharge hopper 69 beneath the chute 86 and have backwardly turned arms or fingers extending therefrom reaching through slots in the upper or crest portions of the corrugated surface of the inclined chute 86 as shown in Fig. 6. The action of these combing wheels 89 is to thoroughly comb out and separate the bunches of vines which are sufficiently large to be engaged by the rake 87 and thus liberate the peas which may be entangled therein. Because of the corrugated surface of the inclined chute 86 the peas that are liberated readily separate from the tangled vines and pass down the trough portions of the corrugated surface. The inclined chute 86 discharges onto an inclined conveyer belt 91 which is in the form of an apron of canvas or other suitable material having slats 92 extending across it on its bottom surface to keep it in shape without forming shoulders for engaging and holding the peas which are discharged thereon by the inclined chute 86. In order that the vines may not slide down the conveyer 91, however, the slats 92 have fingers 93 projecting upwardly from them through the apron and these fingers may be formed integral with metal slats as shown in Figs. 8 and 9 or they may be of sheet metal construction secured to wooden slats as shown in Figs. 10 and 11, or they may be of any other desirable construction. The fingers are preferably narrow so as not to present a surface at their meeting edge with the apron which would serve to hold loose peas and carry them up with the conveyer, thus leaving the peas free to roll down the conveyer while the vines and other tailings are carried upwardly by the conveyer and discharged from the machine. The pulleys 94 at the upper and lower ends of the conveyer 91 are provided with grooves 95 to receive the slats 92 and thus permit of the apron being kept tight at all times while also serving as a driving connection between the pulleys and the apron.

The operation of the pea separator of the present invention is substantially the same as that of the structure covered by my co-pending application referred to, though the provision of the spurs on the hulling beaters in coöperation with the sifter bars serves to prevent the tangling and bunching of the vines by their combing action thereon. The sifter bars with their continuous unbroken inner edge serve to lift the material as with the fingered lifting ribs, permitting the peas to pass between the fingers thereof while the vines are carried up and dropped upon the rotating beaters. The fingers 34 which constitute the spacing members for spacing the longitudinal lifting bar 35 from the walls of the drum to permit the loose peas to pass freely thereby while the vines are held by said bar may be placed close together, as shown, or as far apart as desired and they may be of any length suitable for the purpose. By thus permitting the loose peas to pass through the lifting ribs or between the lifting ribs and the walls of the drum they are afforded an opportunity to more quickly pass out of the drum, since they are not held in the trough-like formations between the lifting ribs and the walls of the drum, but are allowed to roll over the perforated screening surface of the drum until they find openings therein through which they fall. The peas are thus saved an unnecessary exposure to the action of the hulling beaters and are in better condition than when retained within the drum for a longer time. The lifting rib in the present invention consists of a series of fingers mounted on a longitudinal bar as before, but in this case the longitudinal bar, instead of being placed against the wall of the drum as before, constitutes the inner edge of the lifting rib so that the ends of the fingers engage the walls of the drum to constitute spacing members holding the longitudinal bar away from the walls of the drum where it will be effective for holding the vines and prevent them from being caught in the spaces through which the peas pass to escape the lifting rib. The peas liberated by the impact of the hulling beaters against the pods quickly find their way through the openings of the perforated plates 33 and roll down the inclined apron 47 to the conveyer 50. Such peas as may be contained in the tailings, however, are more effectively recovered as the vines are more quickly ejected from the sieve drum by their engagement with the stationary teeth 85 and thus the tendency of the vines to bunch at the discharge end of the drum is prevented and the action of the comb wheels 89 in coöperation with the retarding rake 87 serves to entirely separate vines which may be tangled so that the peas held therein may be liberated and may pass down the grooves of the inclined chute 86 onto the apron of the conveyer 91, the construction of the conveyer being such that this separation of the peas from the tailings is possible. While the vines are effectively carried upward by the conveyer 91 such conveyer presents no obstruction to the downward travel of the peas thereon by reason of the slats being located beneath the apron and by reason of the shape of the fingers which present no surface against which the peas might lodge.

It may be found desirable when the vines are heavy and wet to provide the chute 86 with guards as shown in Figs. 5 and 7 to hold the vines up off of the corrugated surface and assure free travel for the peas in the troughs of the chute. The guard as shown consists of spring rods 100 attached at their upper ends to the underside of the chute and passing through openings in the chute and extending downwardly and forwardly at some distance above the chute. As stated the guard holds vines away from the surface of the chute and the action of the combing wheels 89 is not interferred with thereby, but the combing of the vines and the separation of the peas therefrom is performed in the same manner as when the guards are not present.

In Figs. 20 and 21 there is shown the edge view and a plan view of a modified form of hulling beater in which the width of the beater is the same as before, but the outer end of the beater is provided with a rearwardly extending arm $e$ in alinement with the oblique edge of the beater proper. The object of the projecting arm is to afford a greater beating surface without increasing the surface of the web portion of the beater and thus gain a greater opening effect upon the pods without increasing the fanning effect which might cause the vines to be held by air pressure against the sieve plates.

What I claim as new and desire to secure by Letters Patent is:

1. A pea separator, comprising a rotary sieve drum, rotary hulling beaters contained within the drum, and inwardly projecting sieves having uninterrupted inner edges carried by the drum with their inner ends farther from the axis of the drum than the outer ends of the hulling beaters so as to be beyond the range of the hulling beaters whereby they operate to lift the pea vines and drop them into the path of the hulling beaters to be struck thereby while unsupported, said sieves having openings therethrough extending to near the inner wall of the drum to allow the hulled peas to pass therethrough immediately without being carried along by the sieves so that said peas may escape through the openings of the sieve drum whether the peas are on the ascending portion of the drum or the descending portion thereof.

2. A pea separator, comprising a rotary sieve drum, rotary hulling beaters contained within the drum, inwardly projecting sieves carried by the drum with unbroken inner edges and slots therethrough extending to the inner wall of the drum to allow the hulled peas to pass therethrough immediately without being carried along by the sieve so that said peas may escape through the openings of the sieve drum whether the peas are on the ascending portion of the drum or the descending portion thereof.

3. A pea separator, comprising a rotary sieve drum, rotary hulling beaters contained within the drum, and stationary teeth projecting from points contiguous to the lower edge of the discharge end of the drum to engage the vines in their travel with the drum and assist their discharge from the drum.

4. A pea separator, comprising a rotary sieve drum, rotary hulling beaters contained within the drum, and stationary inclined oblique teeth projecting from points contiguous to the lower edge of the discharge end of the drum to engage the vines as they are carried by the drum to assist in the discharge of the vines from the drum.

5. In a green pea vine separator, a rotary sieve drum, rotary hulling beaters contained therein for opening the pods and liberating the peas, said sieve drum discharging the vines as tailings at one end thereof, an inclined upwardly traveling apron receiving the vines from the sieve drum and carrying them upwardly while permitting the loose peas to roll downwardly thereon, slats extending across the apron on the under side thereof to keep the apron spread without interfering with the downward travel of the loose peas, and narrow fingers projecting upwardly from the slats through the apron to positively engage the vines and carry them away from the discharge end of the drum and prevent their bunching and rolling down the apron and to prevent their interfering with the rolling of the loose peas down the apron.

6. A green pea vine separator, comprising a rotary sieve drum, rotary hulling beaters contained therein for liberating the peas and permitting their discharge through the openings of the sieve drum, said sieve drum discharging the vines at one end thereof as tailings, an inclined chute leading from the discharge end of the sieve drum, combing wheels beneath the chute having arms traveling through slots thereof to assist in the discharge of the vines from the sieve drum, an inclined upwardly traveling apron to receive the vines from the combing wheels and carrying them upwardly while permitting the loose peas to roll down thereon, slats carried by the apron on the under side thereof to keep the apron spread without interfering with the downward travel of the loose peas, and narrow fingers projecting upwardly from the slats through the apron to positively engage the vines and prevent their bunching and rolling down the apron to interfere with the peas rolling down the apron.

7. In a pea separator, a rotary hulling beater, comprising a blade portion oblique with relation to the axis of the sieve drum and provided with a rearwardly extending arm at its outer end in prolongation of its outer edge for increasing the beating surface thereof without increasing the fanning action thereof.

8. A pea separator, comprising a rotary sieve drum, rotary hulling beaters contained within the drum, and inwardly projecting sieve bars carried by the drum with rounded surfaces or surfaces inclined with relation to their direction of movement to be struck by the pea pods to liberate the peas without crushing them and provided with openings between such surfaces through which the peas may escape to the openings of the rotary sieve drum.

9. In a green pea vine hulling machine, a drum, a rotary hulling beater therein, a screening surface forming the wall of the drum, and a lifting rib comprising a longitudinal lifting member and also members spacing said lifting member from the screening surface of the drum to afford a space for the peas between the screening surface and the lifting member.

10. In a pea vine hulling machine the combination of a shaft, a rotary hulling beater on the shaft within the drum, a drum, a plurality of perforated outer screens covering said drum, and a plurality of lifting ribs, each comprising a longitudinal lifting member and also members spacing said lifting member from the screening surface of the drum to provide a passage between the lifting members and the screens.

11. In a green pea vine hulling machine, a drum, a rotary hulling beater therein, a screening surface forming the wall of the drum, a longitudinal lifting bar carried by the drum, and projections at the outer edge of the lifting bar engaging the drum to space the lifting bar proper from the wall of the drum to afford a passage for peas between the lifting bar and the wall of the drum.

12. In a pea vine hulling machine, a drum, a rotary hulling beater therein, a screening surface forming the wall of the drum, a longitudinal lifting bar, and spacing members on the lifting bar engaging the drum to afford spaces between them and between the lifting bar and the wall of the drum for the passage of peas.

In testimony whereof, I affix my signature, in presence of two witnesses.

FRANK HAMACHEK.

Witnesses:
R. S. C. CALDWELL,
KATHERINE HOLT.

Copies of this patent may be obtained for five cents each, by addressing the "Commissioner of Patents, Washington, D. C."